United States Patent [19]

Kurihara

[11] Patent Number: 5,024,509
[45] Date of Patent: Jun. 18, 1991

[54] STRUCTURAL COMBINATION OF PLASTIC LENSES

[75] Inventor: Etsuzou Kurihara, Hachioji, Japan

[73] Assignee: Konica Corporation, Tokyo, Japan

[21] Appl. No.: 491,230

[22] Filed: Mar. 9, 1990

[30] Foreign Application Priority Data

Mar. 14, 1989 [JP] Japan .................................. 1-62681
Jan. 12, 1990 [JP] Japan .................................. 2-5235

[51] Int. Cl.$^5$ ........................... G02B 7/02; G02B 3/00
[52] U.S. Cl. .................................... 350/254; 350/245; 350/252; 350/451
[58] Field of Search ............... 350/451, 479, 239, 240, 350/245, 247, 252, 255, 257

[56]  References Cited

U.S. PATENT DOCUMENTS

4,662,717  5/1987  Yamada et al. ..................... 350/252
4,957,341  9/1990  Hasegawa ........................... 350/254

Primary Examiner—Bruce Y. Arnold
Assistant Examiner—James Phan
Attorney, Agent, or Firm—Jordan B. Bierman

[57]  ABSTRACT

The invention provides a compound lens constituted by a couple of lenses fitted with each other at contact surfaces, in which at least one of lenses is made of plastic. Each of the couple of lenses has a cylinder-shape projection on its periphery. An inner cylinder surface of one cylinder-shape projection and an outer cylinder surface of the other cylinder-shape projection are made to form an inlaying part. At least three engaging points are provided evenly around the circumference in the inlaying part to cause frictional force to prevent the compound lens from being splitted.

20 Claims, 12 Drawing Sheets

STRUCTURAL COMBINATION OF PLASTIC LENSES

BACKGROUND OF THE INVENTION

This invention is concerned with the structure of plastic doublet in combination among a compound lens system composed of plural lenses, especially one of the pair is plastic lens. In the lens system, both lenses are fitted in a fitting surface outside the optical field so that friction prevents slip out and both parts are in contact one another in a plane perpendicular to the optical axis outside the optical field.

In the past plastic lenses have been fitted with all their circumference, just like the case of glass lens.

Figure 35:
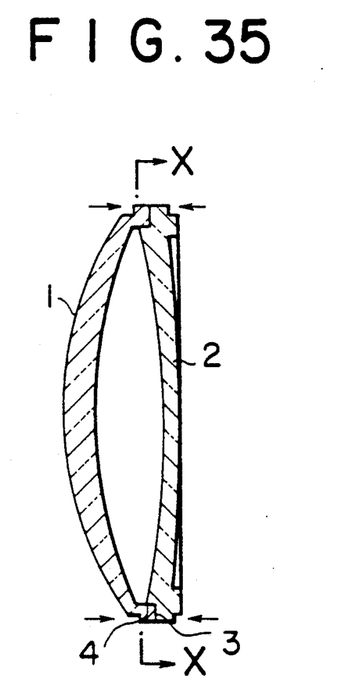
FIG. 35 and 36 illustrates the construction of a compound lens carried out fitting in the way of the conventional method, in a sectional view in the plane including optical axis and in an end view taken in X—X direction.
Figure 36:
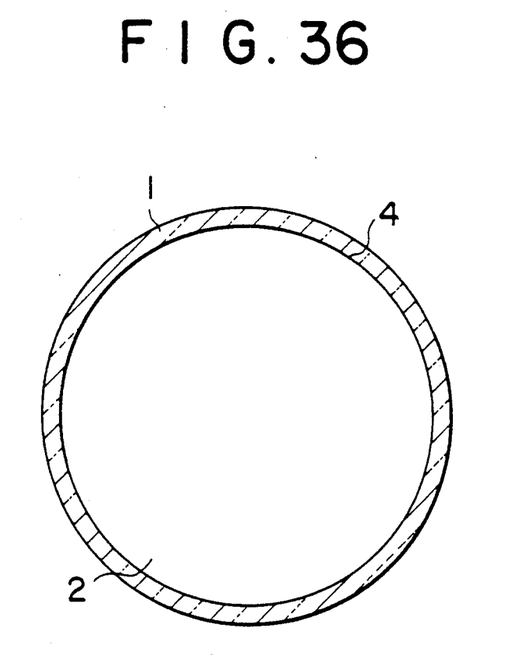

FIG. 35 shows a sectional view of a compound lens consisting of both plastic lens doublet having common optical axis, and FIG. 36 gives its end view taken in direction of arrows X—X in FIG. 35.

In FIGS. 1 and 2 are injection molded plastic lenses, 3 is a contacting surface of plastic lenses 1 and 2 which are in contact in direction of optical axis outside the optical field, and 4 is a circumferential fitting surface of lens 1 and lens 2, also outside the optical field. The contacting surface 3 is usually consisted of side surface of ring perpendicular to the optical axis, and the fitting surface 4 denotes inner and outer circumferences of cylinders. In conventional way of combination, such compound lens is usually held in a holder, of which outermost diameter is not indicated in the figure, and fixed with a threaded ring against a reamed seat in the holder in the direction of arrows.

Injection-molded plastic lenses are (1) difficult to form strict shape in diameter because material is injected through sprue gate on its circumference, (2) less controllable in the accuracy of diameter than that of lens curvature. (3) Temperature produces more thermal effects on the dimensions and form of plastic lens than that of glass lens. (4) There is need to orient a special radial direction for lessening influence of birefringence on combination of plastic lenses. For the reasons, the conventional way of fitting in which the fitting surface 4 is formed of inner and outer circumference of projecting cylinder as shown in FIG. 35 and 36 is led to some problems: Compound lens of plastic doublet is liable to suffer eccentricity/play of component lens due to its unavoidable tolerance in diameter, or reversely forced fitting produces elastic deformation prevailing inside the optical field, or lens fit itself is not available. In any case, it is difficult to obtain an practical fit free from both eccentricity/play and deformation inside optical field.

SUMMARY OF THE INVENTION

This invention is intended to solve above mentioned problems. The object of this invention is to provide combination of a plastic lens with a glass lens, or with another plastic lens being free from eccentricity/play and deformation inside the optical field.

In this invention a couple of lenses, at least any one of which is made of plastic and held in a fit that prevents slip out of the lens, is put in contact in a plane perpendicular to the optical axis outside the optical field. The fitting combination features that the fitting surface consists of more than three partial contacts about evenly provided around the circumference of said plastic lens for the said purpose.

In other words, in the structural combination of the present invention, in which said plastic lens is put in partial contact in more than three positions located on its circumference at about even interval with friction that prevents slip out, the intended fit being free from eccentricity/play and deformation inside the optical field is obtainable with ease.

BRIEF DESCRIPTION OF THE DRAWINGS

FIG. 7 gives a partial diagrammatic view of FIG. 2, FIG. 8 and 9, FIG. 10 and 11, FIG. 12 and 13, FIG. 14 and 15, FIG. 16 and 17, FIG. 20 and 21, FIG. 27 and 28, FIG. 29 and 30, FIG. 33 and 34, show other embodiments of the structural combination of such compound lens carried out pursuant this invention in sectional views including optical axis and an end views taken in the direction of arrows, respectively.

DETAILED DESCRIPTION OF THE INVENTION

Figure 6:
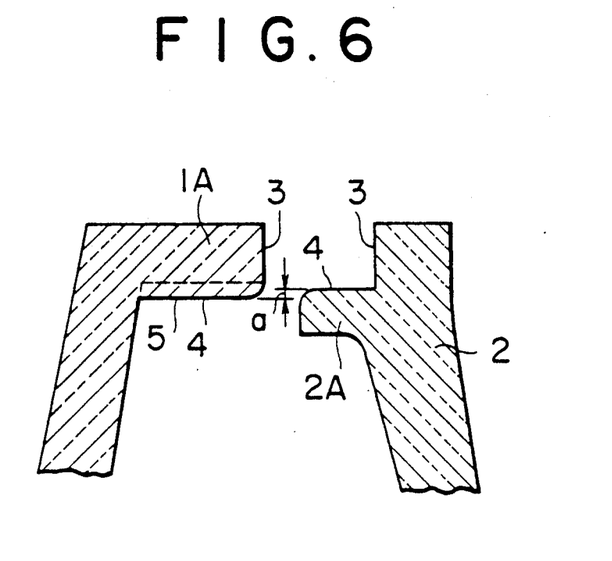
FIG. 6 illustrates the compound lens before interference fit in fragmentary sectional view in the plane including optical axis.
Figure 7:
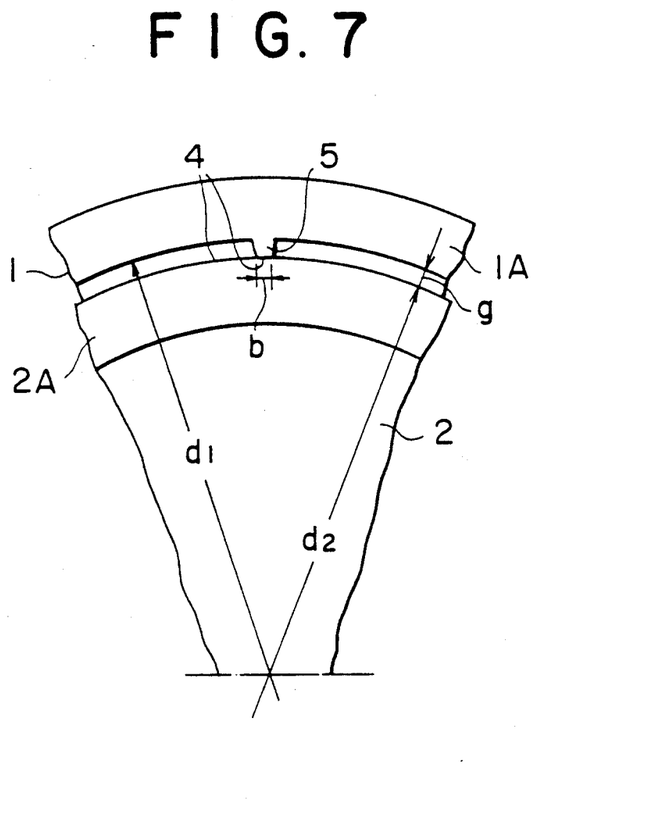

With a compound lens as shown in FIG. 1 and 2, or FIG. 6 and 7, lens 1 is a injection-molded plastic lens and lens 2 is either a injection-molded plastic lens or glass lens. Lens 1 and lens 2 are put in contact so that the optical axis-perpendicular end of cylinder-shape projecting portion 1A of lens 1 is put in contact with a peripherals of lens 2 perpendicular to optical axis and outside projecting cylinder 2A of lens 2, in such a fit that partial contact of four (4) inward protrusions 5 provided evenly on the inner surface of the said projecting cylinder 1A is fitted with the outer surface of the said projecting cylinder 2A of lens 2. In this interference fit between lens 1 and 2, favorable depth of the interference given as a difference "a" between the internal circle of tip of protrusions 5 provided inside said projecting cylinder of lens 1 and outer surface of said projecting cylinder of lens 2 in FIG. 6, is 0 to 0.3 mm, most preferably 0.05 to 0.1 mm. And as shown in FIG. 7, the favorable tip width "b" of said protrusions after interference fit is less than 2 mm, most preferably less than 0.5 mm, and sum of fit width of protrusions 5 to outer circumference (circumference of cylinder-shape projection on lens 2 in this case) is 15% as desirable value, and most preferably 5% or less.

The plastic lenses to meet these requirements are easy to obtain in injection molding even if the precision in lens surface is a most important factor. If lens 1 and lens 2 satisfy above requirements in tolerance, the compound lens is free from eccentricity/play as well as deformation inside the optical field because the [elastic] deformation caused by interference "a" is absorbed in the protrusion 5 and the projecting cylinder 1A outside the optical field. Furthermore in the case lens 1 and 2 are made of plastic, it is possible to choose radially best favorable mutual position so that the effect of birefringence is eliminated at most for the best performance of compound lens.

However, if protrusions 5 of plastic lens 1 are provided uneven around the circumference, eccentricity/play between lens 1 and 2 is liable to occur. As to interference "a", if "a" is negative, or there is clearance between lens 1 and 2, possibility of eccentricity/play between lens 1 and 2 will increase. On the contrary, if said interference "a" is greater than 0.3 mm, increased deformation will prevail in the optical field because the stress surpasses those that can be absorbed in the protrusions 5 and the projecting cylinder including said protrusions 5. For the reason, interference "a" should be in a range 0.05 to 0.1 mm in order to prevent eccentricity/play. Further, if partial circumference contact width "b" of protrusions 5 is more than 2 mm or if the ratio of sum of contact width "b" to the total circumference is more than 15%, upper limit of said interference depth "a" must be largely lessened than 0.3 mm to release the influence of increased interference "a". If the upper limit is set strict to avoid resultant deformation, it will make difficult to obtain such plastic lenses as that satisfy both requirements for surface accuracy and tolerance in interference. In order that elastic deformation caused by interference "a" may absorb in protrusions 5 and projecting cylinder including protrusions 5, contact width b is preferred to be 0.5 mm or less and ratio of the sum of each width b to circumference 5% or less.

Position of protrusions 5 on plastic lens 1 is not restricted to quadrant positions on circumference but trisect or quintile and more divided positions are also available for this purpose. However, considering that diameter of injection molded lens differs between the direction of injection and a direction perpendicular to it, most preferable configuration is those consisting of even number of protrusions 5 and the injection sprue gates made between them. From view point of ease in making injection dies, 10 or less number of division, especially quadrant protrusions shown in the examples are best.

Figure 2:
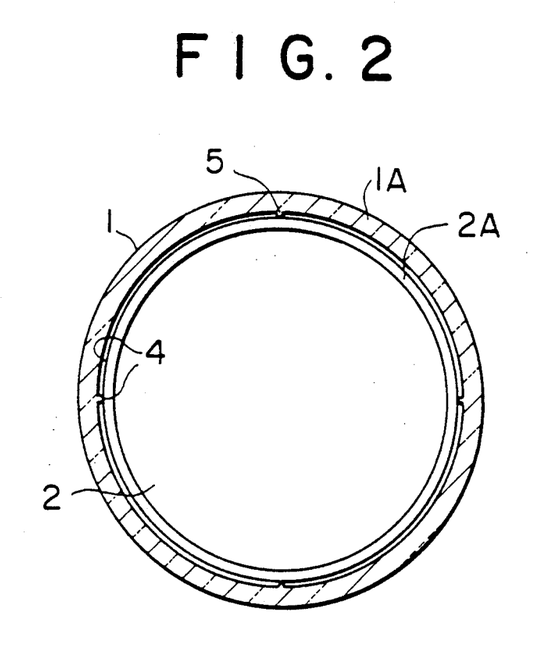
FIG. 2 and FIG. 4 are the end views taken in the direction of arrows in FIG. 1 and 3, respectively.
Figure 5:
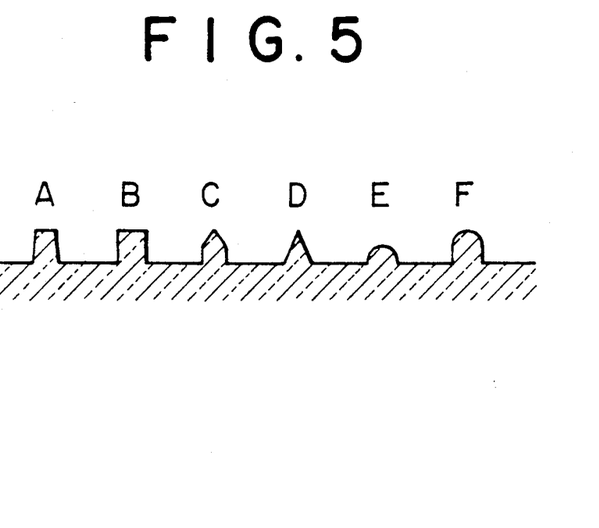
FIG. 5 gives some modifications of protrusions in sectional view taken in the plane perpendicular to the optical axis.

Concerning shape of protrusion 5, besides those as shown in FIG. 2 and FIG. 7 and trapezoid in sectional view as shown in FIG. 5A, shapes as shown in FIG. 5B–F are usable for the purpose. The essential thing for the protrusion is that the shape can absorb elastic deformation caused by interference "a" of 0–0.3 mm and width b less than 2 mm on fitting. In order that the protrusion 5 absorbs the stress caused by interference "a", the height of protrusion 5 after subtracted interference "a", or in other words, clearance "g" of two projecting cylinder surfaces indicated by inner diameter $d_1$ of cylinder portion 1A of lens 1 including protrusion 5 and outer diameter $d_2$ of cylinder portion 2A of lens 2, with which protrusions 5 are in interference contact, is preferred to be bigger than small. However, if it is excessive, the protrusions become fragile, and for the reason it should be the same to twice of width "b" after subtracting interference "a".

Figure 3:
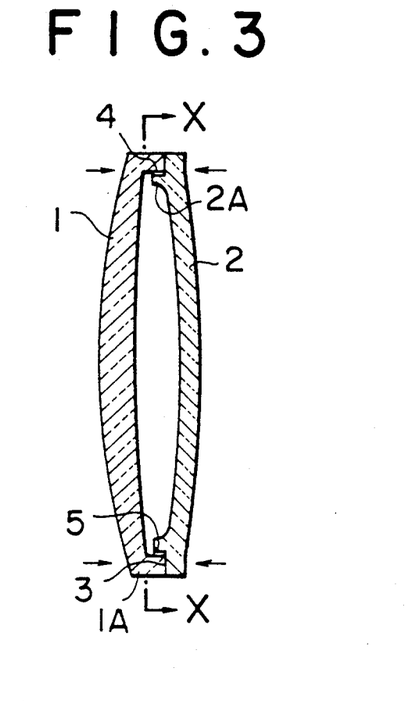
Figure 4:
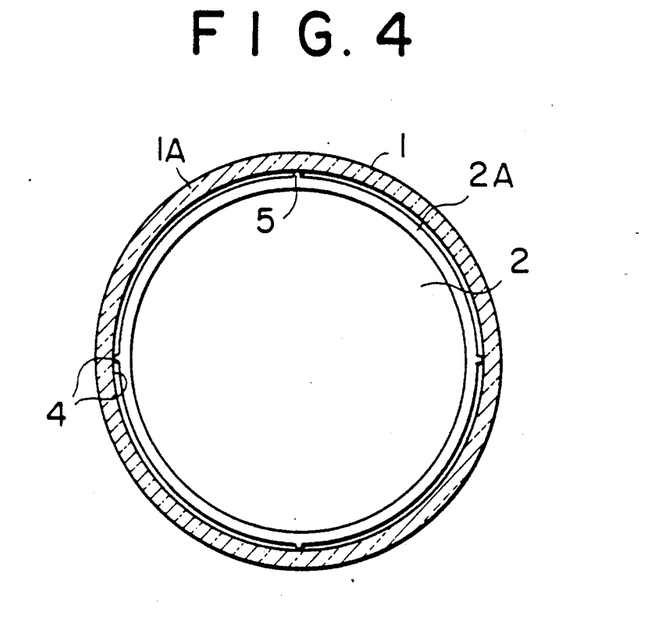
Figure 8:
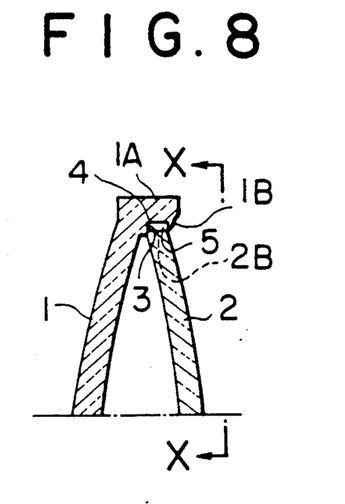
Figure 9:
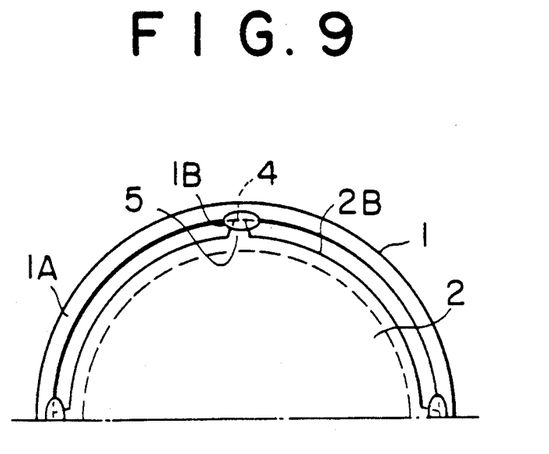

The said structural combination, in which protrusions 5 is subjected to an elastic deformation by interference "a", can be afforded besides typical embodiments as described above. In FIG. 3 and 4 said protrusions 5 are provided outer surface projecting cylinder of lens 2, and in FIG. 8 and 9 said protrusions 5 are provided around the circumference of lens 2 itself. The compound lens in FIG. 3 and 4 differs from the lens in FIG. 1 and 2 in that whereas lens 2 is injection-molded plastic lens, lens 1 is either injection-molded plastic lens or glass lens, and that protrusions 5 are provided on the outer surface of projecting cylinder portion 2A of lens 2 and put in contact with inner surface of projecting cylinder 1A of lens 1. FIG. 8 and 9 shows another compound lens consisted of two plastic lenses in which lens 2 is fitted to inner surface of projecting cylinder 1A of lens 1. This structure of combination differs from that of FIG. 3 and 4 in that both lenses are of plastic and protrusions 5 are provided on circumference of lens 2 to fit with inner surface of projecting cylinder of lens 1 forming a contacting plane 3 at base of projecting cylinder 1A of lens 1 in rim of lens 1 perpendicular to optical axis, and in that over-projecting portion of cylinder 1A on the lens 1 is deformed by heat to form hooks 1B to prevent slip out of lens 2. In this fitting, same good effect can be gotten as in the compound lens in FIG. 1 and 2.

Figure 1:
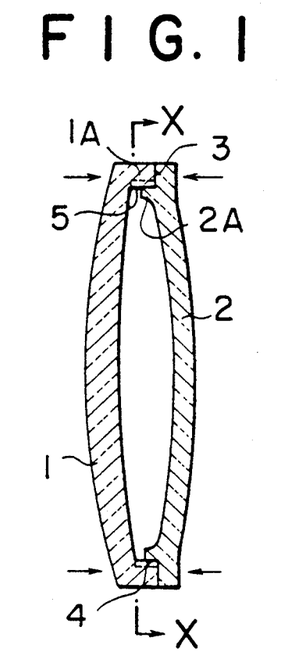
FIG. 1 and FIG. 3 illustrate construction of compound lenses carrying out combination pursuant the present invention in cross sectional view in the plane including optical axis.
Figure 10:
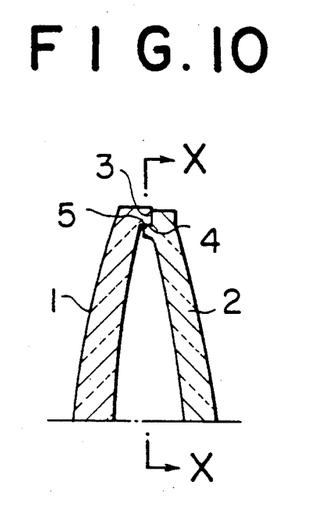
Figure 11:
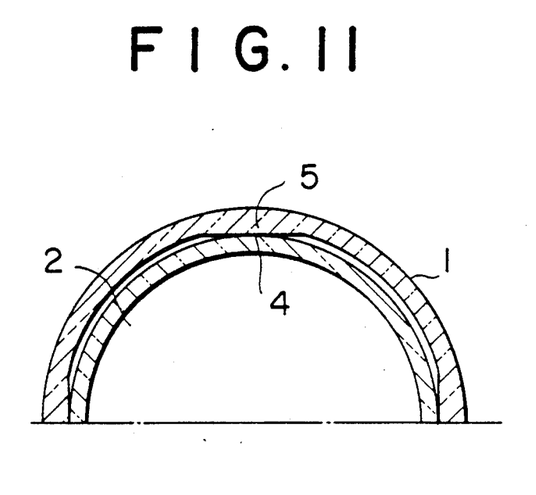

In a compound lens in FIG. 10 and 11, protrusions 5 are modified to be bow shake from those shown in FIG. 1 and 2. This structure of combination gives the same result as those in FIG. 1 and 2 and FIG. 3 and 4, but with slight increase in interference "a", stress tends to prevail inside the optical field because of rapid increase in of affection of interference "a" to it fitting surface.

In the structure of compound lenses mentioned above, one of fitting surfaces is on plastic lens having protrusions more than three (3) provided around the circumference with about equal distance, and the other fitting surface is on circumference of a glass lens or plastic lens. FIG. 12 and 13, FIG. 14 and 15, and FIG. 16 and 17 give also embodiments of compound lens of such structure of combination, respectively.

Figure 12:
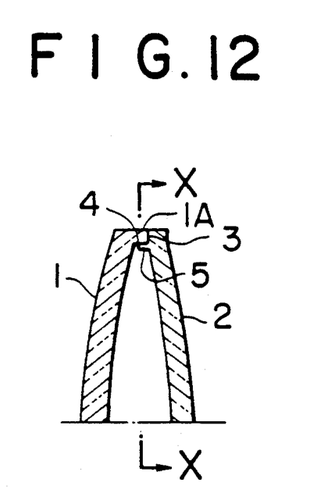
Figure 13:
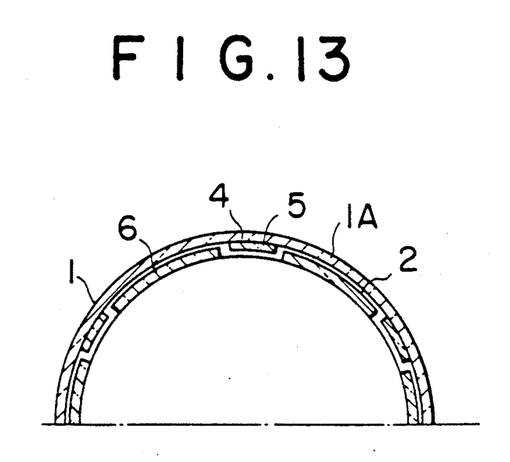

The compound lens in FIG. 12 and 13 consists of plastic lens 2 and glass lens 1, like that in FIG. 3 and 4. In this structure of combination, lens 1 is same in shape as that of lens 1 in FIG. 3 and 4, lens 2 has six (6) brims like partial cylindrical projection with even distance on its contacting rim 3 perpendicular to optical axis, which fit to inner surface of cylinder-shape projecting portion 1A on lens 1 with friction that prevent slip out. Both lenses 1 and 2 are united by contacting at the surfaces 3 perpendicular to common optical axis. In this structure of combination, combining pressure is mainly produced by elastic bending deformation of brim-shape partial projecting cylindrical portions 5, there may be possibility that pressure becomes excessive in root portion of the projection portion 5 or brims become out of contact in its tip. The structure of fitting differs from those described hitherto in FIG. up to 11 in which contacting pressure is produced by elastic compression deformation. The intended effect is also available in this structure of combination. By the way, in FIG. 13 partial projecting cylinder-shape brims 6 provided on lens 2 between protrusions 5 with bigger width than those of protrusions 5 are auxiliary portion to guide and protect protrusions 5 from excessive deformation to breakdown in combining process. They have almost no role on the finished compound lens.

Figure 14:
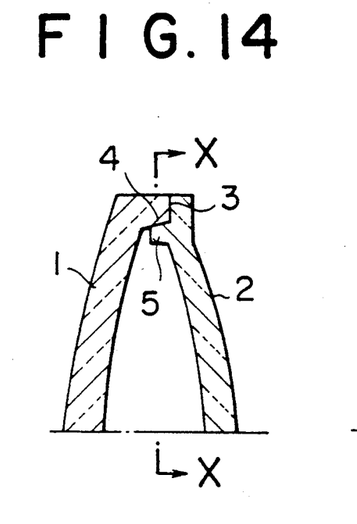
Figure 15:
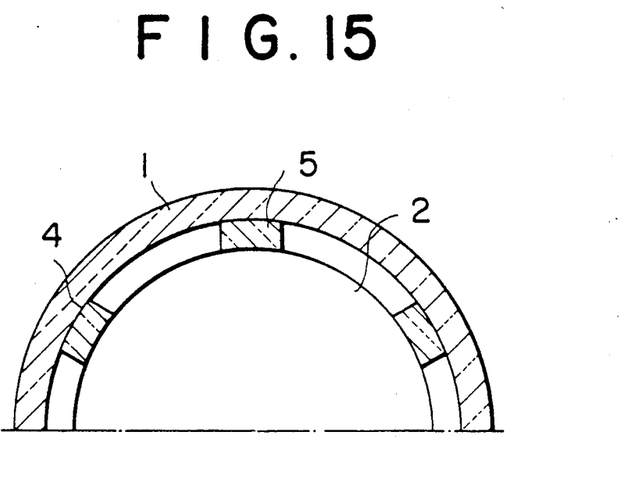

Compound lens in FIG. 14 and 15 differs from that in FIG. 12 and 13 in the structure of contacting surface; the fitting surface in FIG. 1 and 2 is replaced with a taper shaped surface. Different from that in FIG. 12 and 13 there is no protecting brims for protection of protrusions 5. Tapered fitting surface can reduce the fault that tip of protrusion 5 becomes out of contact in structure in FIG. 12 and 13. But on the other hand, more accuracy is required for contacting surface 3 to get precision contact in the direction of optical axis.

Figure 16:
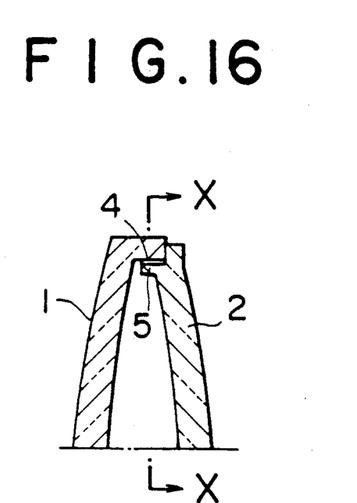
Figure 17:
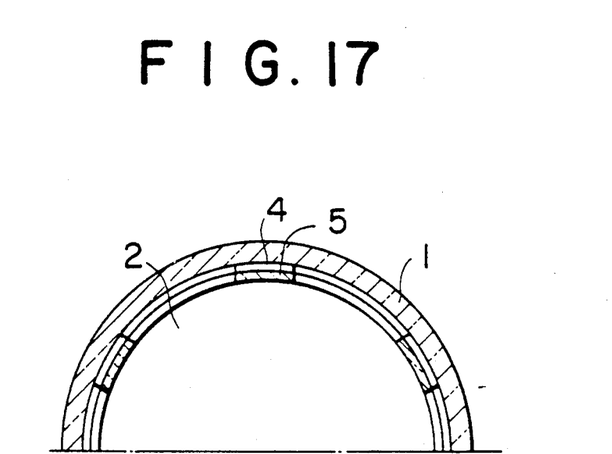

The compound lens in FIG. 16 and 17 differs from that in FIG. 12 and 13; fitting surface 4 forms a screw shaped surface in order to solve problem that occurs in the structure in FIG. 12 and 13. However, this structure accompanies another problem that production cost of lenses 1 and 2 is too high.

Figure 18:
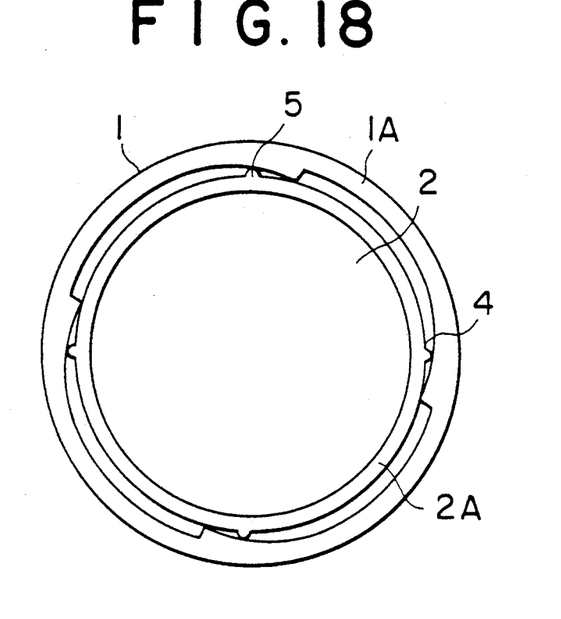
FIG. 18 and FIG. 19 show alternate embodiment of the compound lens under this invention in front view.
Figure 19:
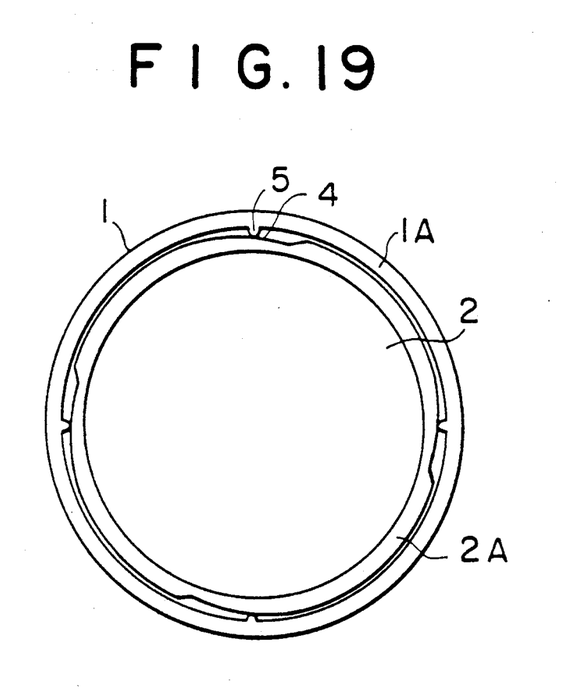

All the compound lenses hitherto described are common in that fitting surface at the circumference is such as inner or outer cylinder surface, tapered surface, or screw shaped surface, but in FIG. 18 and FIG. 19 lenses are fitted through tapered cam surface for the purpose. In compound lens in FIG. 18 outward projections 5 provided around inner surface of projecting cylinder portion 2A of lens 2 is put in compressed contact with tapered cam surface 4 provided on circumference of projecting cylinder 1A of lens 1. Different from the compound lens in FIG. 1 and 2, in FIG. 19, inward projections 5 on inner surface of projecting cylinder of lens 1A is put in contact with tapered cam 4 provided on outer surface of projecting cylinder 2A of lens 2. This structure of combination affords also the desired fitting, but production of lens 1 and lens 2, which has fitting cam, costs much, not so much as that of thread fitting version. Another problem is that the structure needs special consideration to prevent turn of lens 1 to lens 2 where projections 5 slip down along the cam.

For another embodiment of structural combination in which fitting surface of two lenses is formed between the surface of protrusions provided evenly more than three (3) points on circumference of one lens, and the contacting portions provided evenly more than three (3) point on the circumference of another lens, FIG. 20 and 21, FIG. 24, FIG. 25, FIG. 26, FIG. 27 and 28 are presentable.

Figure 20:
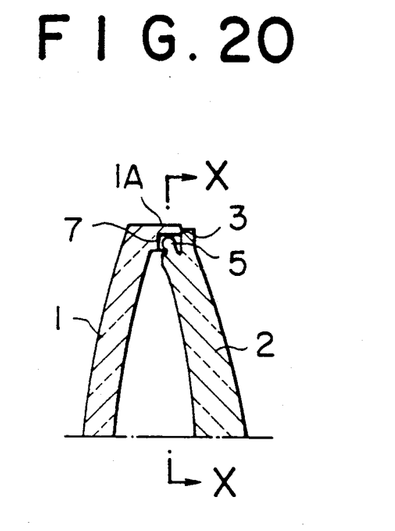
Figure 21:
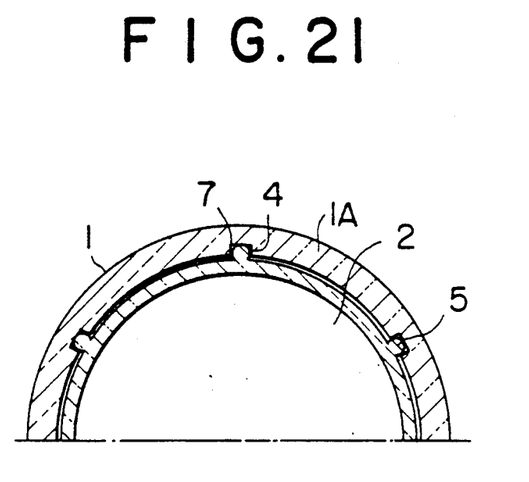
Figure 22:
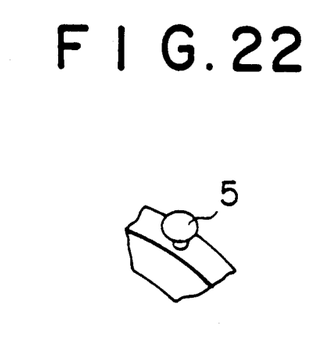
FIG. 22 and 23 are partial perspective views illustrating protrusions for the structural combination in FIG. 20 and 21, respectively.
Figure 23:
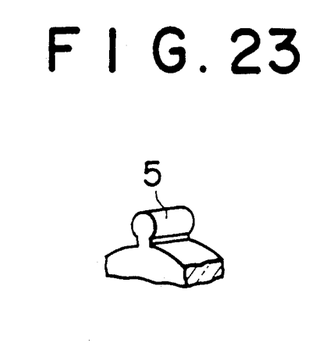

Compound lens in FIG. 20 and 21 is composed of plastic or glass lens 1 and plastic lens 2. Protrusions 5, which are at outer surface of a cylinder-like portion projecting parallel to optical axis at inside edge of contacting surface 3 of lens 2 and provided at six (6) points on the cylinder circumference as shown in FIG. 22, are fitted in compression contact with rectangle-shaped receiving grooves 7, which are provided on inner surface of projection cylinder portion of lens 1. In said contact surface, the end of cylinder-shape projecting portion 1A of lens 1 is put in contact with contacting surface of lens 2, in which both surfaces are opposite each other in the direction of optical axis. In this instance, protrusions 5 are possible to be formed as shown in FIG. 23, and further, protrusions can be provided on lens 1 instead of lens 2 and grooves on lens 2. In such case lens 1 is plastic lens and lens 2 is plastic or glass lens. However, this structure of compound lens, especially with protrusions 5 of form as shown in FIG. 22, has problem that it costs more than the plastic lens with screw shaped contacting surface.

Figure 24:
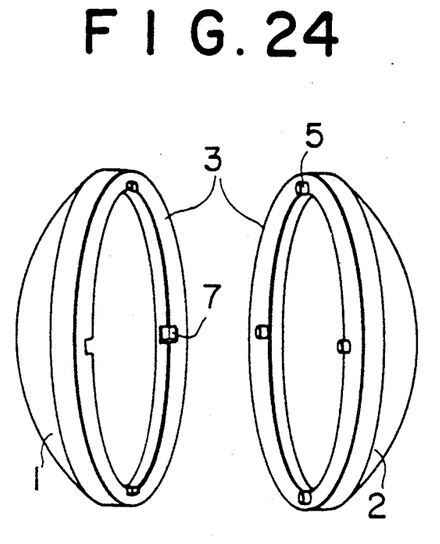
FIG. 24, FIG. 25 and FIG. 26 are perspective views showing other embodiments in respect to protrusion in the structural combination.
Figure 25:
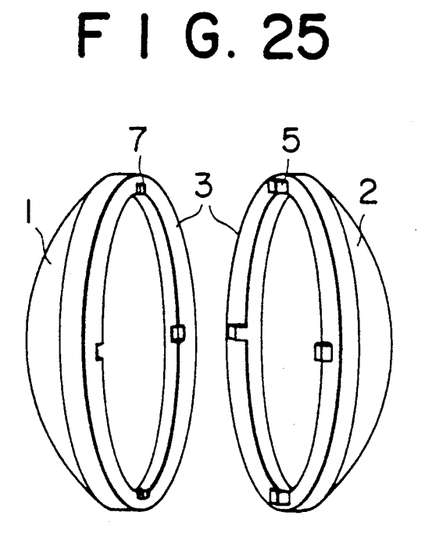
Figure 26:
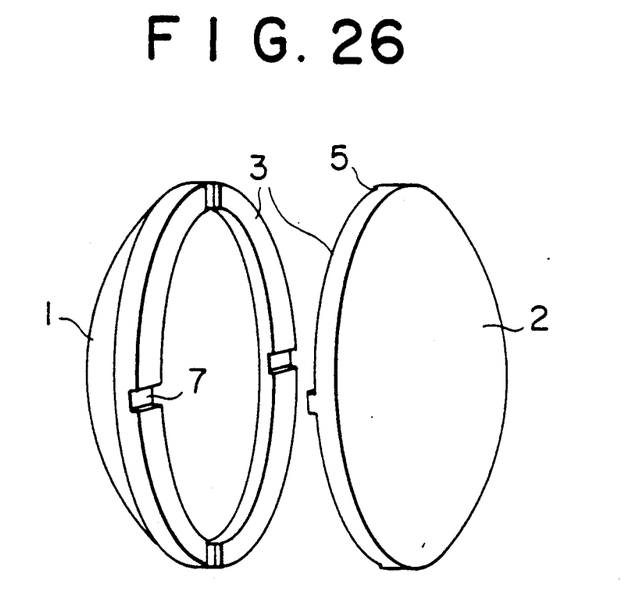

On the contrary, structures in FIG. 24 to FIG. 26 are intended to lower production cost of lens 2 by means of such protrusions 5 as projecting from the contacting surface 3 of lens 2 which faces with lens 1 in the direction of optical axis, instead of using the same lens 2 as used in compound lens in FIG. 20 and 21. Among these, structure of rod-shape protrusion in FIG. 24 resembles close to that in FIG. 20 and 21, and is thus easiest to produce in injection molding. Opposite to the structure above, structure with square rod protrusions 5 as shown in FIG. 25 and FIG. 26 has problems that poor fit between protrusion 5 and groove 7 causes loose-fit in the direction perpendicular to optical axis, and that such lens is difficult to form in injection molding. However, structure FIG. 26 in which protrusions 5 and their receiving grooves 7 come in contact in the plane perpendicular Lo optical axis, especially with grooves cut radially throughout the rim as shown in FIG. 26, is useful to lower production cost of lens 1 and 2, but still higher than those of structures in FIGS. up to 11.

Figure 27:
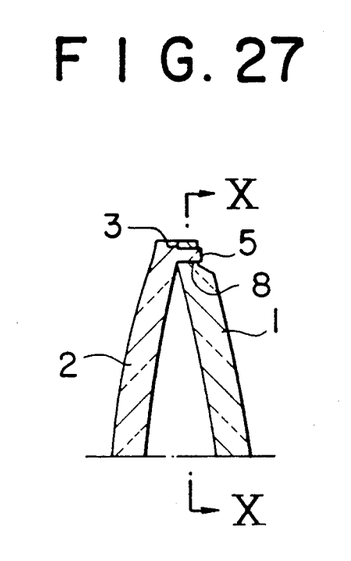
Figure 28:
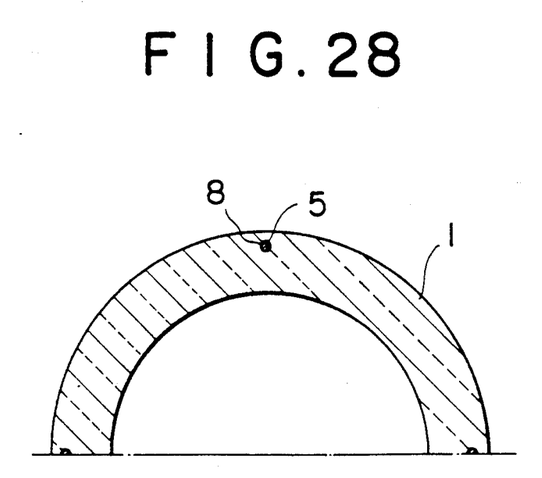

In compound lens in FIG. 27 and 28, a lens 1 with holes 8 is used in place of lens 1 in FIG. 24, and when protrusions on lens 2 is inserted through the holes under pressure, both lenses are put in contact on the contacting plane perpendicular to the optical axis, then tips of said protrusions are deformed by heat to prevent separation. In this structure production cost of lens 1 with holes 8 is lower than that of lens 1 with rectangular groove in FIG. 24 and FIG. 25, or shown in FIG. 20 and 21. However, this structure also has problem that loose-fit between protrusions 5 and holes 8 result in play in the direction perpendicular to optical axis and no availability of fitting.

Figure 29:
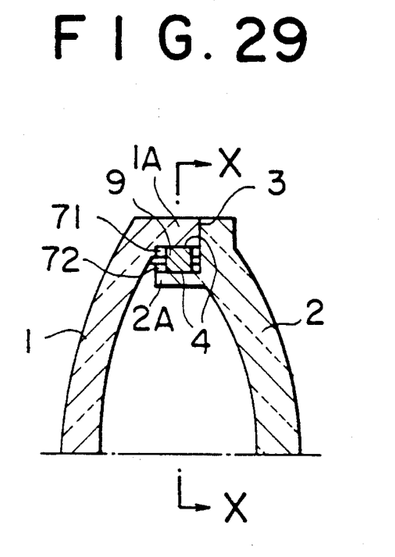
Figure 30:
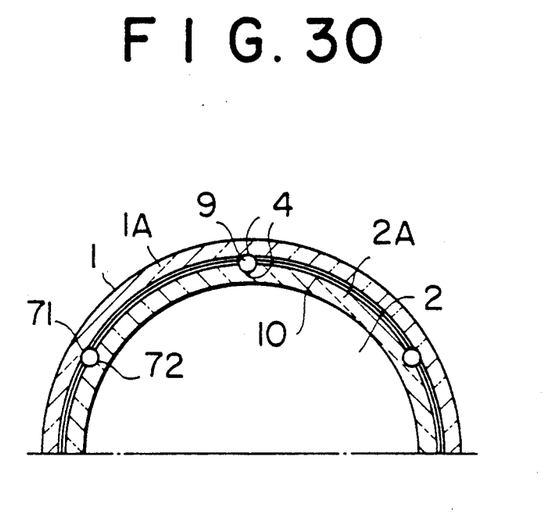
Figure 31:
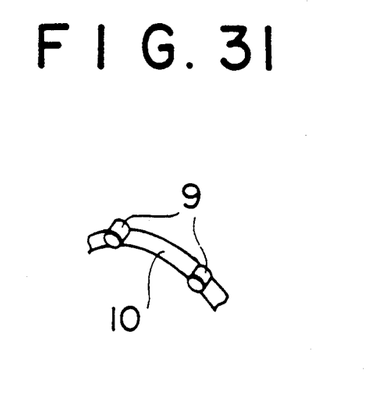
FIG. 31 and FIG. 32 represent partially the inserting parts used for embodiments in FIG. 29 and 30, and FIG. 33 and 34 in perspective view.
Figure 33:
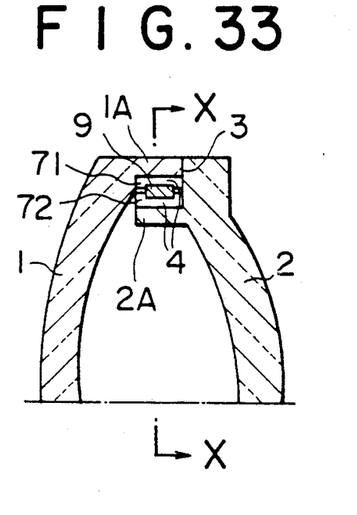

In structures of compound lenses hitherto described, lens 1 and lens 2 are in direct contact on fitting surface 4, but in compound lenses in FIG. 29 and 30, and FIG. 33 and 34, fitting of lenses 1 and 2 are combined in such structure as that a pair of plastic lenses or pair of plastic lens and glass lens are fitted with parts 9 of ball or roller shape as shown in FIG. 31 and FIG. 33 inserted between the fitting surfaces 4 of lens 1 and lens 2 to cause friction to stop slipping off. Because inserting parts are made of plastic in this case, it is possible to use glass lenses for both, but the resulting fit is worse in contact.

Figure 34:
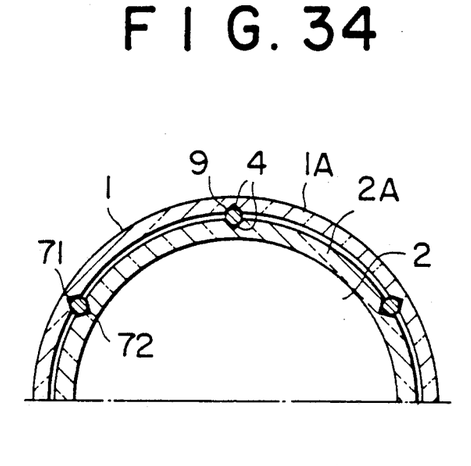

Difference between FIG. 29 and 30 and FIG. 33 and 34 in the structure is sectional shape of grooves which are fabricated on inner surface of projecting cylinder 1A of lens 1 as well as on projecting cylinder 2A of lens 2 placed opposite to it with narrow separation, located at six (6) even positions on lens circumference; in both structures, grooves 71 and 72 are in the direction of optical axis and determine fitting surface 4. In the former, arc shaped grooves with about the same radius as that of insertion rod are formed and, in the latter grooves are of V-shape in sectional view and are the shape like a part of the square circumscribed the insertion rod. Therefore, structure in FIG. 29 and 30 is similar to that in FIG. 27 and 28 in fitting condition, and structure in FIG. 33 and 34 is similar to FIG. 24.

Figure 32:
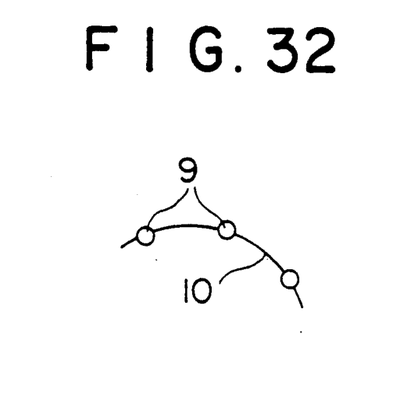

In FIG. 31 and FIG. 32, insertion rods 9 are linked with retainer 10 for easy handling, separate insertion rods are usable as well.

All the compound lenses carried on pursuant the present invention as described above can be held in a lens holder, in the same way as compound lens as illustrated in FIG. 35 and 36.

The invention is not restricted to the embodiments described above, for instance, in structures of combination in FIGS. 12 to 17 an alternate embodiment in which protrusions 5 are provided so as to project from outer circumference of contacting surface 3 so that its inside surface is in contact with outer surface of projecting portion of lens 1 with friction enough to prevent slip out. However, in the case where said compound lens is held in a holder as described above, it is necessary to use a holder having inner diameter greater than outer diameter of protrusions 5 as fitting diameter.

With use of the structure of combination pursuant the present invention, the compound lens being securely aligned in optical axis and free from eccentricity/play caused by elastic deformation in fitting of lens and stress prevailing inside the optical field, in which at least either of double is made of plastic, is obtainable with ease.

What is claimed is:

1. A compound lens constructed from a pair of lenses, at least one of which is made of plastic, said compound lens comprising;
    a contact part, disposed outside the optical field of said compound lens, in which contact surfaces of said pair of lenses are brought into contact with each other, each of said contact surfaces being perpendicular to the optical axis of said compound lens; and
    an engagement part, disposed outside the optical field, for causing frictional force to prevent said contact surfaces from being brought out of contact with each other, said engagement part including at least three engagement points, evenly located around the circumference of said pair of lenses for engaging a part of said pair of lenses,
    wherein each of said pair of lenses having a cylinder-shaped projection on the periphery thereof, an inner cylindrical surface of one cylinder-shaped projection and an outer cylindrical surface of the other cylinder-shaped projection forming an inlaying part, said engagement part being provided in said inlaying part,
    said engaging part comprising a surface of a protrusion provided on the inlaying part of said plastic lens and the other inlaying part, said surface of said protrusion being a part of a threaded surface of said protrusion, said other inlaying part being a threaded surface.

2. The compound lens of claim 1 wherein engaging members are protrusions.

3. The compound lens of claim 2 wherein surfaces of said protrusions are tapered.

4. The compound lens of claim 2 wherein the wall to which said protrusions are not fixed is tapered.

5. The compound lens of claim 2 wherein both said surface of protrusions and said wall to which said protrusions are not fixed are tapered.

6. The compound lens of claim 2 wherein both the surfaces of said protrusions and said wall to which said protrusions are not fixed are threaded.

7. The compound lens of claim 2 wherein the wall to which said protrusions are not fixed is shaped in the form of a slanted cam surface.

8. The compound lens of claim 2 wherein the wall to which to said protrusions are not fixed is grooved so as to receive said protrusions.

9. The compound lens of claim 8 wherein said first lens is made of plastic and, wherein portions of said cylindrical collar corresponding to said surface for coming in contact with the wall to which said protrusions are not fixed are deformed by heat after said first and second lenses are engaged.

10. The compound lens of claim 2 wherein said protrusions are not more than 0.3 mm greater than said clearance.

11. The compound lens of claim 10 wherein said protrusions are not more than 0.05 to 0.1 mm greater than said clearance.

12. The compound lens of claim 2 wherein a fitting length of one of said protrusions in a circumferential direction is less than 2 mm.

13. The compound lens of claim 12 wherein a ratio of the sum of the fitting length of said protrusions to the circumference of said circumferential wall is not more than 15 percent.

14. The compound lens of claim 13 wherein said ratio is not more than 5 percent.

15. A compound lens constructed from a pair of lenses, at least one of which is made of plastic, said compound lens comprising;
    a contact part, disposed outside the optical field of said compound lens, in which contact surfaces of said pair of lenses are brought into contact with each other, each of said contact surfaces being perpendicular to the optical axis of said compound lens; and
    an engagement part, disposed outside the optical field, for causing frictional force to prevent said contact surfaces from being brought out of contact with each other, said engagement part including at least three engagement points, evenly provided around the circumference of said pair of lenses, for engaging a part of said pair of lenses,
    wherein each of said pair of lenses has a cylindrical-shaped projection on the periphery thereof, an inner cylindrical surface of one cylinder-shaped projection and an outer cylindrical surface of the other cylinder-shaped projection forming an inlaying part, said engagement part being provided in said inlaying part, and
    wherein the engaging part comprises a hole formed by grooves provided on both inlaying parts and a member inserted into said hole.

16. A compound lens constructed from a pair of lenses, at least one of which is made of plastic, said compound lens comprising;
    a first lens having a cylindrical collar around its circumference,
    a second lens having a circular wall shaped to be inlaid inside said cylindrical collar with a clearance therebetween, and
    at least three engaging members fixed to either the inner wall of said cylindrical collar or the outer wall of said circular wall, each of said engaging members having a surface for coming into contact with the wall to which they are not fixed and sized to be larger than said clearance so that said first and second lenses are engaged by interference fit between said surfaces of the engaging members and said wall to which they are not fixed.

17. The compound lens of claim 16 wherein engaging members are circularly arranged with an equal pitch therebetween.

18. The compound lens of claim 16 wherein said second lens has a cylindrical collar, said circular wall being an outer wall of said cylindrical collar.

19. The compound lens of claim 16 wherein said circular wall is an outer circumferential edge of said second lens.

20. The compound lens of claim 16 wherein said engaging members are core-shaped members provided on the inner wall of said cylindrical collar.

* * * * *